United States Patent
DiRosa et al.

(10) Patent No.: US 11,677,716 B2
(45) Date of Patent: Jun. 13, 2023

(54) SYSTEM OF A DISTRIBUTED WEB APPLICATION FIREWALL CLUSTER

(71) Applicant: Dell Products L.P., Round Rock, TX (US)

(72) Inventors: Frank DiRosa, Pflugerville, TX (US); Rene Herrero, Round Rock, TX (US); Poul C. Frederiksen, Austin, TX (US); Yongliang Li, Round Rock, TX (US); Rashmi Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 16/653,319

(22) Filed: Oct. 15, 2019

(65) Prior Publication Data
US 2021/0112032 A1   Apr. 15, 2021

(51) Int. Cl.
*H04L 29/06* (2006.01)
*H04L 9/40* (2022.01)

(52) U.S. Cl.
CPC ...... *H04L 63/0218* (2013.01); *H04L 63/1416* (2013.01); *H04L 63/1425* (2013.01); *H04L 63/20* (2013.01)

(58) Field of Classification Search
CPC ............. H04L 63/0218; H04L 63/1425; H04L 63/1416; H04L 63/20; H04L 63/0236; H04L 63/0245
See application file for complete search history.

(56) References Cited

U.S. PATENT DOCUMENTS

| | | | |
|---|---|---|---|
| 10,063,519 B1* | 8/2018 | Zhao | H04L 63/0263 |
| 2010/0199345 A1* | 8/2010 | Nadir | H04L 63/02 726/11 |
| 2015/0264011 A1* | 9/2015 | Liang | H04L 63/02 726/11 |
| 2016/0164837 A1* | 6/2016 | Wu | H04L 67/02 726/11 |
| 2016/0359809 A1* | 12/2016 | Phonsa | H04L 63/0263 |
| 2017/0180322 A1* | 6/2017 | Agarwal | H04L 63/0263 |
| 2019/0028504 A1* | 1/2019 | Shtar | H04L 67/22 |
| 2019/0222558 A1* | 7/2019 | Kahn | H04L 63/0236 |

(Continued)

OTHER PUBLICATIONS

Huawei Web Application Firewall User Guide. Published Aug. 20, 2018 (pp. 1-93) https://developer-res-cbc-cn.obs.cn-north-1.myhuaweicloud.com/upload/files/pdf/20171206/20171206173915_2406.pdf (Year: 2018).*

(Continued)

*Primary Examiner* — Joseph P Hirl
*Assistant Examiner* — Thomas A Gyorfi
(74) *Attorney, Agent, or Firm* — Terrile, Cannatti & Chambers, LLP; Emmanuel A. Rivera

(57) ABSTRACT

A system, method, and computer-readable medium are disclosed for management of a distributed web application firewall (WAF) cluster that supports one or more protected applications. A WAF cluster infrastructure is configured for the protected applications. The WAF cluster includes one or more WAFs that are used to route traffic directed to the protected applications. The WAF cluster infrastructure is validated as to be current and updated. The validated WAF cluster infrastructure is then used as routing service.

20 Claims, 6 Drawing Sheets

(56) References Cited

U.S. PATENT DOCUMENTS

2019/0364072 A1\* 11/2019 Purusothaman .... H04L 63/0281
2020/0036615 A1\* 1/2020 Lewis ..................... H04L 63/02

OTHER PUBLICATIONS

AskF5: "K10978895: Blocking malicious traffic using the IP Intelligence feature in BIG-IP AFM" Published Aug. 7, 2019 (4 pages) https://support.f5.com/csp/article/K10978895 (Year: 2019).\*
Fastly Help Guides; "Using the IP block list" Published Nov. 6, 2018 (3 pages) https://docs.fastly.com/en/guides/using-the-ip-block-list (Year: 2018).\*
"Block Attacks from Specific IP Addresses in AWS WAF" Published Jun. 25, 2019 (12 pages) https://www.wafcharm.com/en/blog/block-attacks-from-specific-ip-addresses-in-aws-waf/ (Year: 2019).\*
nginx.com, What is NGINX Plus?, downloaded Oct. 15, 2019.
Palo Alto Networks, Global Cybersecurity Leader, downloaded Oct. 15, 2019.
F5, Advanced Application Threats Require an Advanced WAF, white paper, 2018.
signalsciences.com, Next Generation Web Application Firewall (WAF), Complete Cloud-Native Web Application Security, 2019.

\* cited by examiner

SYSTEM OF A DISTRIBUTED WEB APPLICATION FIREWALL CLUSTER

BACKGROUND OF THE INVENTION

Field of the Invention

The present invention relates to the management of information handling systems. More specifically, embodiments of the invention provide a system, method, and computer-readable medium for improved management of web application firewall clusters.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A web application firewall or WAF, filters, monitors, and blocks HTTP/HTTPS traffic to and from a web application. WAFs typically are configured to filter traffic at the software application level, whereas traditional firewalls protect at the network and transport level. As to the seven layers of the Open Systems interconnection or OSI reference model, the application layer is at "layer 7" and, the transport layer is at "layer 4", and the network layer is at "layer 3."

WAFs and traditional firewalls can typically be provided in front of an entire business infrastructure, at an Infrastructure as a Service or IaaS level. An IaaS can be a form of cloud computing that provides virtualized computing resources over the Internet. In such an implementation, the WAF uses the same rule base to protect all of the software applications. Not all software applications may require the same level of protection. Therefore, if a rule does not apply to a particular software application, the WAF merely increases latency and provides no added security protection benefit. Furthermore, manual deployment of WAFs in the front of an entire business infrastructure, can be inflexible, developer resource demanding, and error prone.

SUMMARY OF THE INVENTION

A system, method, and computer-readable medium are disclosed for management of a distributed web application firewall (WAF) cluster that supports one or more protected applications. A WAF cluster infrastructure is configured for the protected applications. The WAF cluster includes one or more WAFs that are used to route traffic directed to the protected applications. The WAF cluster infrastructure is validated as to be current and updated. The validated WAF cluster infrastructure is then used as routing service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for management web application firewall or WAF clusters. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
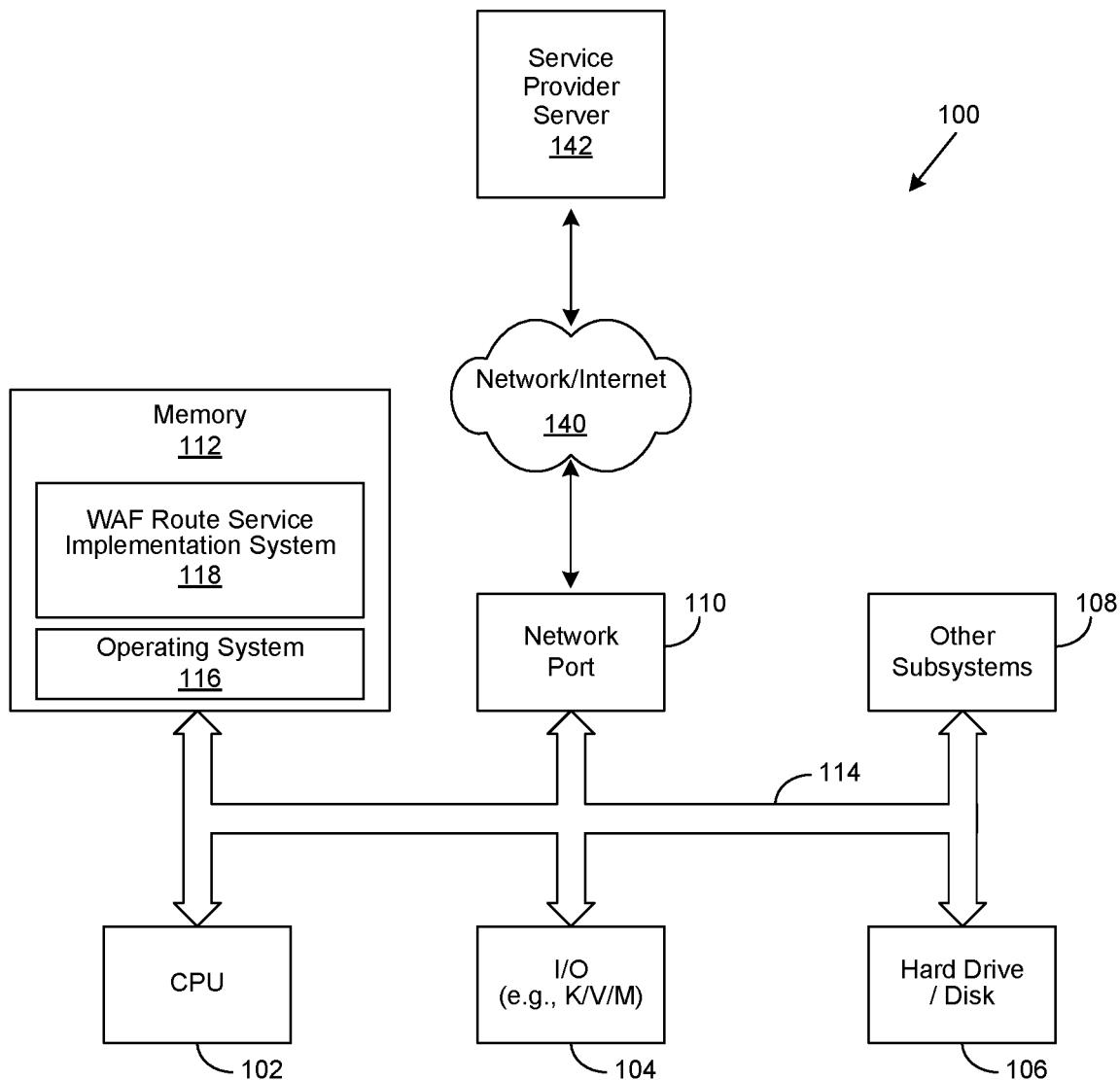
FIG. 1 is a general illustration of components of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a WAF route service implementation system 118.

In general, the WAF route service implementation system 118 provides for implementation of management of WAF clusters, that includes providing for WAF self-service, automated upgrades, scalability, and self-healing. In certain implementations, as further described below, the WAF route service implementation system 118 can be integrated into software deployment platform, such as Pivotal Cloud Foundry (PCF), and a container orchestration tool, such as Kubernetes. In certain implementations, multiple WAF clusters can be implemented, where each WAF cluster can be tailored to particular applications, instead of a universal "do it all" WAF cluster. Continuous integration/continuous delivery(deployment) or CI/CD pipelines, containerization, WAF operators in the container orchestration tool can be implemented in order to keep current/update security rules/configuration for WAF clusters. In certain implementations, the loyalty coin miner 118 is provided as a service from the service provider server 142.

Figure 2:
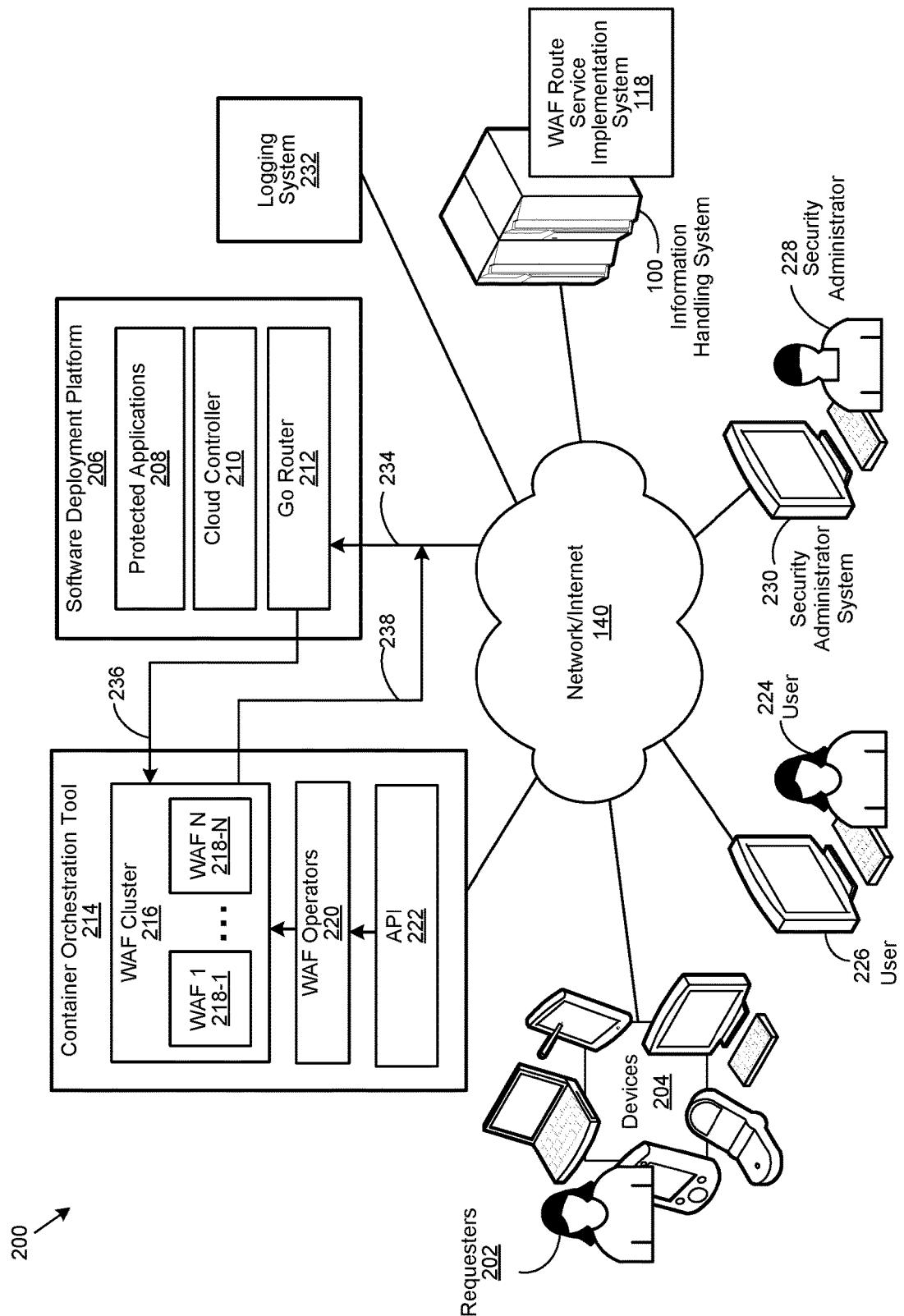
FIG. 2 is a simplified block diagram of a system for distributed web application firewall (WAF) clusters.

FIG. 2 is a simplified block diagram of a system 200 for distributed WAF clusters. In certain embodiments, a WAF is a software implemented virtual firewall that can be configured, managed, and deployed in a WAF cluster via the container orchestration tool (e.g., Kubernetes), where the WAF acts as a route service. In other words, the WAF directs HTTP/HTTPS traffic (e.g., requests) as to an application(s). In certain implementations, a WAF can be tailored to protect a specific type of application or applications. Furthermore, deploying a WAF/WAF cluster closer to an application and configuring a tailored ruleset for the WAF/WAF cluster can lead to lower latency and false positives as compared to traditional WAF implementations, such as in front of an entire business infrastructure.

The system 200 includes requesters 202 who request access to applications, such as applications related to website access, downloadable applications, etc. The requesters can have specific/unique identifiable internet protocol or IP addresses. Requestors 202 can provide their requests to devices 204. The devices can send the requests in the form of HTTP/HTTPS traffic to network/Internet 140. As used herein, devices 204 refers to an information handling system such as a personal computer, a laptop computer, a tablet computer, a personal digital assistant (PDA), a smart phone, a mobile telephone, or other device that is capable of communicating and processing data. In certain implementations, devices 204 are representative of an environment that includes various computing devices (e.g., servers), storage, software solutions, hardware (e.g., accessories), etc. In certain embodiments, the network 140 may be a public network, such as the Internet, a physical private network, a wireless network, a virtual private network (VPN), or any combination thereof.

The requests or HTTP/HTTPS traffic from devices 204 are sent to a software deployment platform 206. The software deployment platform 206 can be implemented as Pivotal Cloud Foundry (PCF). For certain implementations, the software deployment platform 206 includes protected applications 208, a cloud controller 210 and a go router 212. In particular, the go router 212 receives the requests or HTTP/HTTPS traffic.

In this example, the system 200 can include a container orchestration tool 214. The container orchestration tool 214 can be implemented as Kubernetes. The container orchestration tool 214 can include one or more WAF clusters as represented by WAF cluster 216. Each WAF cluster 216 can include one or more WAFs, as represented by "WAF 1" 218-1 to "WAF N" 218-N. Furthermore, the container orchestration tool 214 can include WAF operators 220, which can be implemented to perform actions on the WAF cluster 216 and "WAF 1" 218-1 to "WAF N" 218-N. An application program interface or API 222 can be included in the container orchestration tool 214 and configured to receive and pass on actions to the WAF cluster 216 and "WAF 1" 218-1 to "WAF N" 218-N.

Users 224 can be administrators of the protected applications 208 and/or their related websites. Users 224 can be site managers, developers, etc. or any entity with an interest in/responsibility for protected applications 208. In certain instances, users 224 are PCF users. Users 224 can configure the WAF cluster 216 and/or "WAF 1" 218-1 to "WAF N" 218-N for the protected applications 208. Users 224 are connected through network/Internet 140 through user system 226, where user system 226 is representative of information handling systems that can various computing devices (e.g., servers), storage, software solutions, hardware (e.g., accessories), etc.

The system 200 can also include security administrator 228. The security administrator 228 is an administrator or managers that may monitors for suspicious or dangerous IP addresses, which can be traced to particular requestors 202. In certain implementations, the security administrator 228 can identify or flag such IP addresses and create or update a ruleset or configuration for WAF cluster 216 and/or "WAF 1" 218-1 to "WAF N" 218-N. The ruleset or configuration can be global or specific to a WAF cluster 216 and/or WAF(s) 218. Such suspicious or dangerous IP addresses (i.e., requesters 202) can be avoided. Security administrator 228 is connected through network/Internet 140 through security administrator system 230, where security administrator system 230 is representative of information handling systems that can include various computing devices (e.g., servers), storage, software solutions, hardware (e.g., accessories), etc.

The system 200 can further include a logging system 232. The logging system 232 can include logging repositories, such as searchable WAF logs. The information handling systems 100 and the WAF routing service implementation system 118 are connected through network/Internet 140.

In an example implementation, when requests or HTTP/HTTPS traffic from devices 204, as represented by 234 are received by the go router 212, the go router 212 sees a route service to a WAF (i.e., WAF cluster 216 and/or "WAF 1" 218-1 to "WAF N" 218-N) and sends the requests or HTTP/HTTPS traffic 236 to WAF cluster 216 (i.e., "WAF 1" 218-1 to "WAF N" 218-N). WAF cluster 216 checks the requests or HTTP/HTTPS traffic 236, and if valid (i.e., safe), sends the requests or HTTP/HTTPS traffic 238 back to the go router 212. The go router 212 recognizes that the requests or HTTP/HTTPS traffic has gone to and been verified by the WAF cluster 216 and allows access to the protected applications 208. In certain implementations, the go router 212 provides or sends a hash/code to the protected applications 208 to allow the requests or HTTP/HTTPS traffic.

Figure 3:
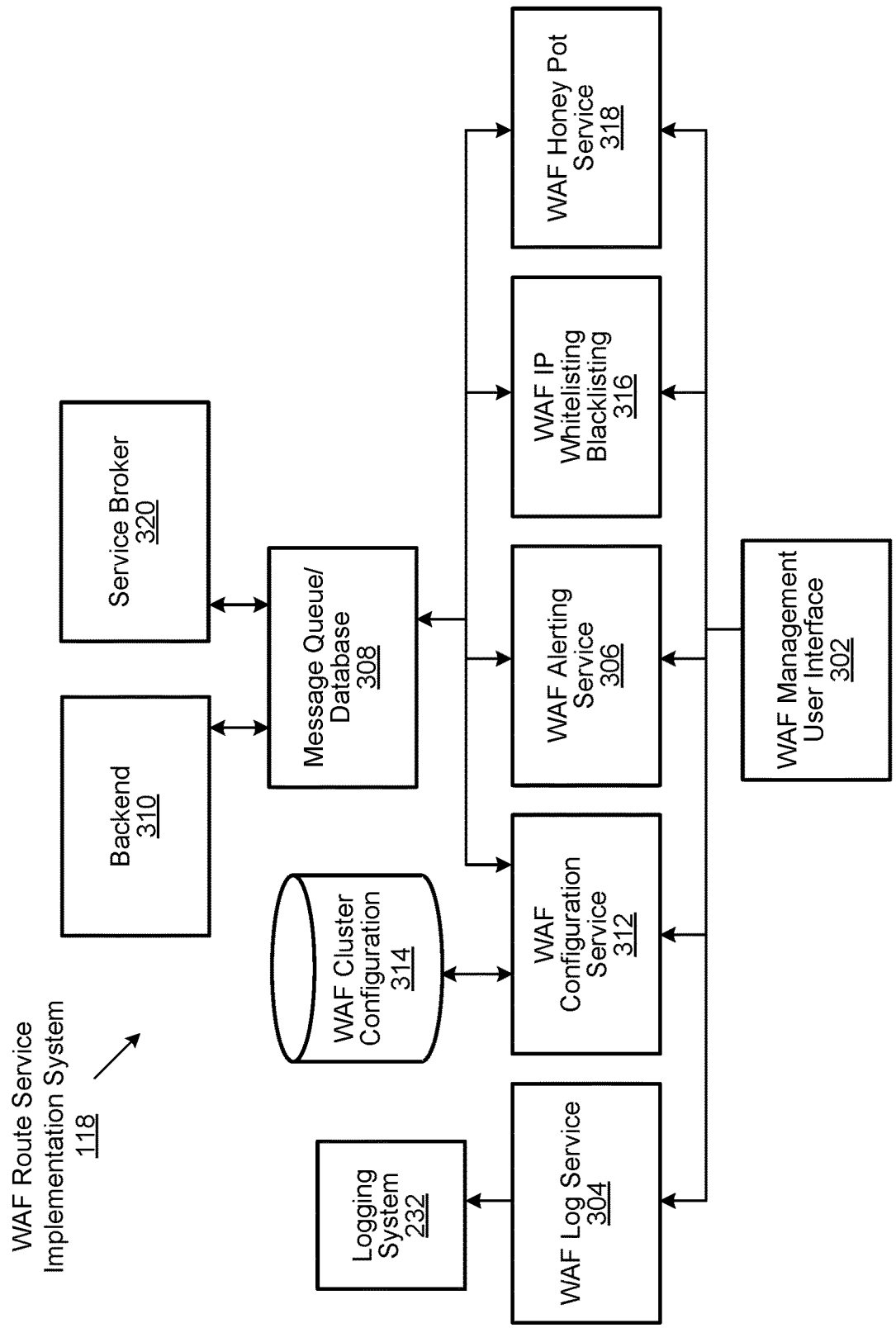
FIG. 3 is a simplified block diagram of a web application firewall (WAF) route service system.

FIG. 3 shows a block diagram of a web application firewall (WAF) route service system 118. The WAF route service system 118 can include a WAF management user interface 302 which can be used by users 224 and security administrator 228 to access and provide input, through their respective systems 226 and 228, to the WAF route service system 118 as shown in FIG. 2. WAF management user interface 302 can be used to manage different WAF cluster(s) 216 and/or WAF(s) 218.

With continued reference to FIG. 2, WAF management user interface 302 allows users 224, once they have a provisioned WAF cluster(s) 216 and/or WAF(s) 218 to view requests or HTTP/HTTPS traffic 236 and update configurations. The security administrator 228 can also administrative settings through the management user interface 302. Various Settings can be added/deleted/updated via the WAF management user interface 302, including IP address blocking.

WAF management user interface 302 can be connected to a WAF log service 304 for updating to the logging system 232. The logging system 232 can be configured to log various log times and include logging repositories, such as searchable repositories of WAF logs. WAF cluster(s) 216 can have a logging stream that can be picked up by a logging system 232. Example of a logging stream includes "Azure Log Analytics", ELK stack, etc. Queries from the WAF management user interface 302 to the logging system 232 can provide in depth knowledge to the traffic going through the WAF cluster(s) 216 and/or WAF(s) 218.

WAF management user interface 302 can connect and provide alerts to a WAF alerting service 306. The alerts can be from security administrator 228. The WAF alerting service 306 can be used when a protected application is getting attached. WAF alerting service 306 or an API that is part of WAF alerting service 306, can create code/data that is pushed to a message queue/database 308 to allow a backend 310 to read and understand the alerts. The backend 310 through the API 222 of FIG. 2 provide the alert to WAF operators 220 of FIG. 2. Based on the alerts, WAF operators 220 can take appropriate actions as to the WAF cluster(s) 216 and/or WAF(s) 218.

As discussed above, various settings can be added/deleted/updated via the WAF management user interface 302, including IP address blocking. The backend 310 picks up these changes and submits them to the WAF operators 220, which who can reload WAF configurations without any downtime. The message queue/database 308 can be an intermediate message storage, and in certain implementations store WAF related information/data.

WAF configuration services 312 can allow for configuring or updating of WAF cluster(s) 216 and/or WAF(s) 218, as to tailored suite of WAFs for users 224 of FIG. 2. In certain instances, auto updating is performed as to WAF cluster(s) 216 of particular users 224. In certain implementations, the WAF configuration services 312 is an API. Messages as to configuration updates from the WAF management user interface 302 is sent to WAF configuration services 312, which are forwarded to the message queue/database 308. The messages are in sent to backend 310 and are forwarded API 222 and WAF operators 220. In certain implementations, the WAF configuration services 312 is connected to a WAF cluster configuration store 314. The WAF cluster configuration store 314 can be implemented to store different WAF Cluster configurations.

The WAF route service system 118 can include a WAF IP whitelisting blacklisting component 316, which in certain implementations can be used by security administrator 228 of FIG. 2 to identify potentially dangerous/malicious requestors by respective IP addresses, by blacklisting such IP addresses. Known or determined safe IP addresses can be identified by whitelisting. Blacklisted and white listed IP addresses are then sent by WAF IP whitelisting blacklisting component 316 to message queue/database 308. The blacklisted and white listed IP addresses are in sent to backend 320 and are forwarded API 222 and WAF operators 220.

In certain implementations, the WAF route service system 118 can include a WAF "honey pot" service component 318 which can be implemented to list potentially dangerous/malicious IP addresses as identified by a community, such as a community of Internet users. The WAF "honey pot" service component 318 may or may not be implemented by users 224.

A service broker 320 can be used to add/provide WAFs. The software deployment platform, 206 (e.g., Pivotal Cloud Foundry), and a container orchestration tool 214 (e.g., Kubernetes) shown in FIG. 2 can include standardized extensible points and ca be implemented with open source APIs that have a list of functions. In certain implementations, the service broker 320 can be implemented to work with and provide WAFs through such APIs.

Figure 4:
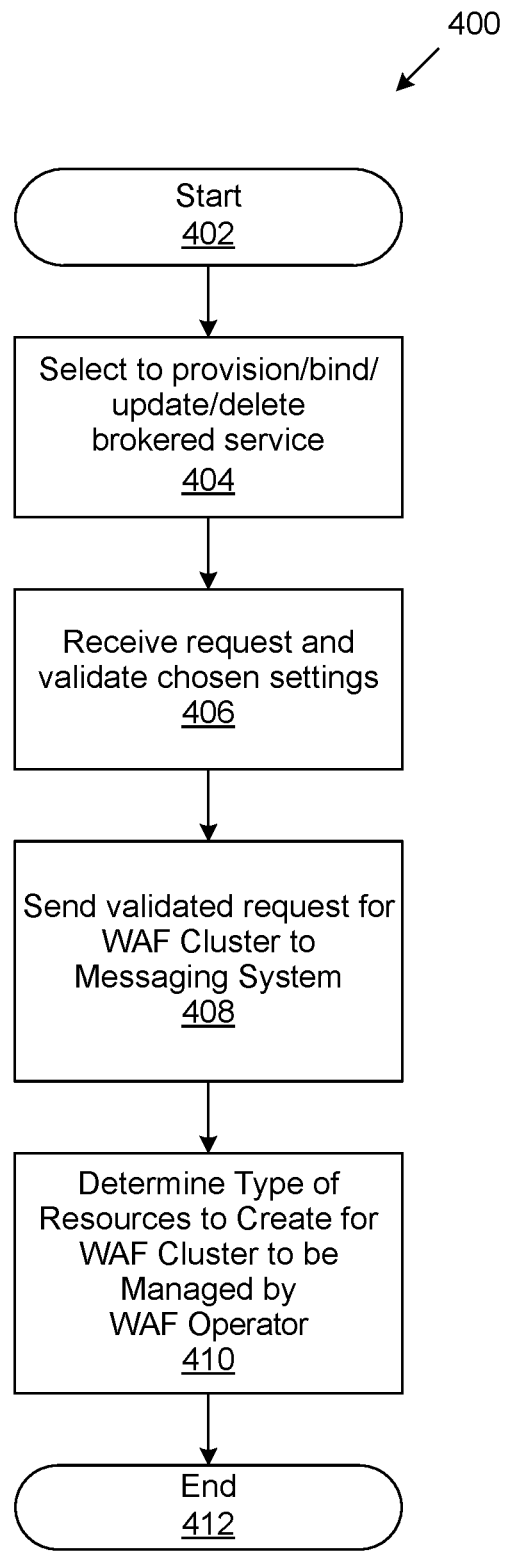
FIG. 4 is a general flowchart for web application firewall (WAF) cluster provisioning.

FIG. 4 is a generalized flowchart 400 for web application firewall (WAF) cluster provisioning. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At step 404, selection is made to provision, bind, update, and/or delete a WAF infrastructure from a brokered service directed to an application(s). Selection can be made regarding variables directed to a WAF cluster size, etc. In certain implementations, user 224 provides selection through a user interface of the software development platform 206 (e.g., PCF). At step 406, a request is received as to WAF infrastructure. In certain implementations, the service broker 320 receives the request from cloud controller 210 and validates the selected/chosen settings. At step 408, the validated request for WAF cluster infrastructure is sent. In certain implementations, the validated request is sent to message queue/database 308. At step 410, a determination is made as to resources/types of resources to create for the WAF cluster (infrastructure) to be managed by the WAF operator(s) 220. In certain implementation, the backend 310 picks up the WAF infrastructure request messages from message queue/database 308 to determine the type of resources to create. The backend 310 then creates WAF Cluster resources in container orchestration tool 214 (e.g., Kubernetes) that will be managed by the WAF operator(s) 220. At block 412, the process 400 ends.

Figure 5:
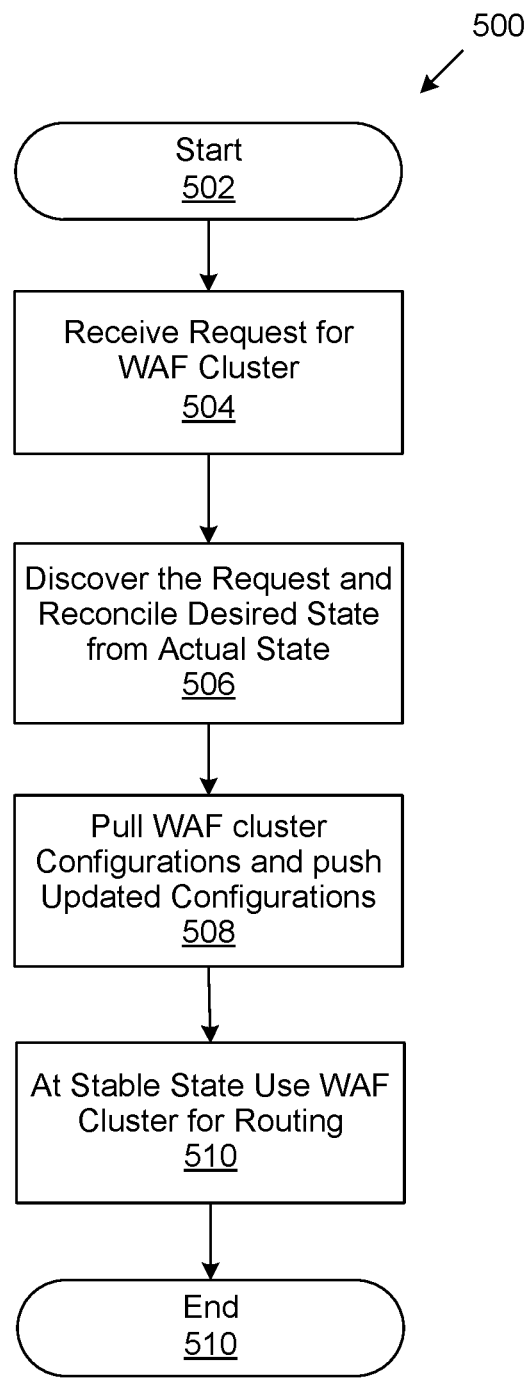
FIG. 5 is a general flowchart for container orchestration tool management.

FIG. 5 is a generalized flowchart 500 for container orchestration tool management (e.g., Kubernetes). The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, a request is received for a WAF cluster. The WAF cluster can be for custom defined resources. At step 506, the request is discovered, and reconciliation is performed. In certain implementations, WAF operator(s) 220 discovers the requests and reconciles desired state from actual state. The reconciliation can include "pods," configuration maps, certificates, settings, etc. At step 508, WAF cluster configurations are pulled and WAF update configurations are pushed. In certain implementations, if the actual and desired WAF cluster configurations are different, WAF operator(s) 220 can reconcile accordingly. At step 510, when at stable state, and the WAF cluster can be used as a route service. At 512, the process 500 ends.

Figure 6:
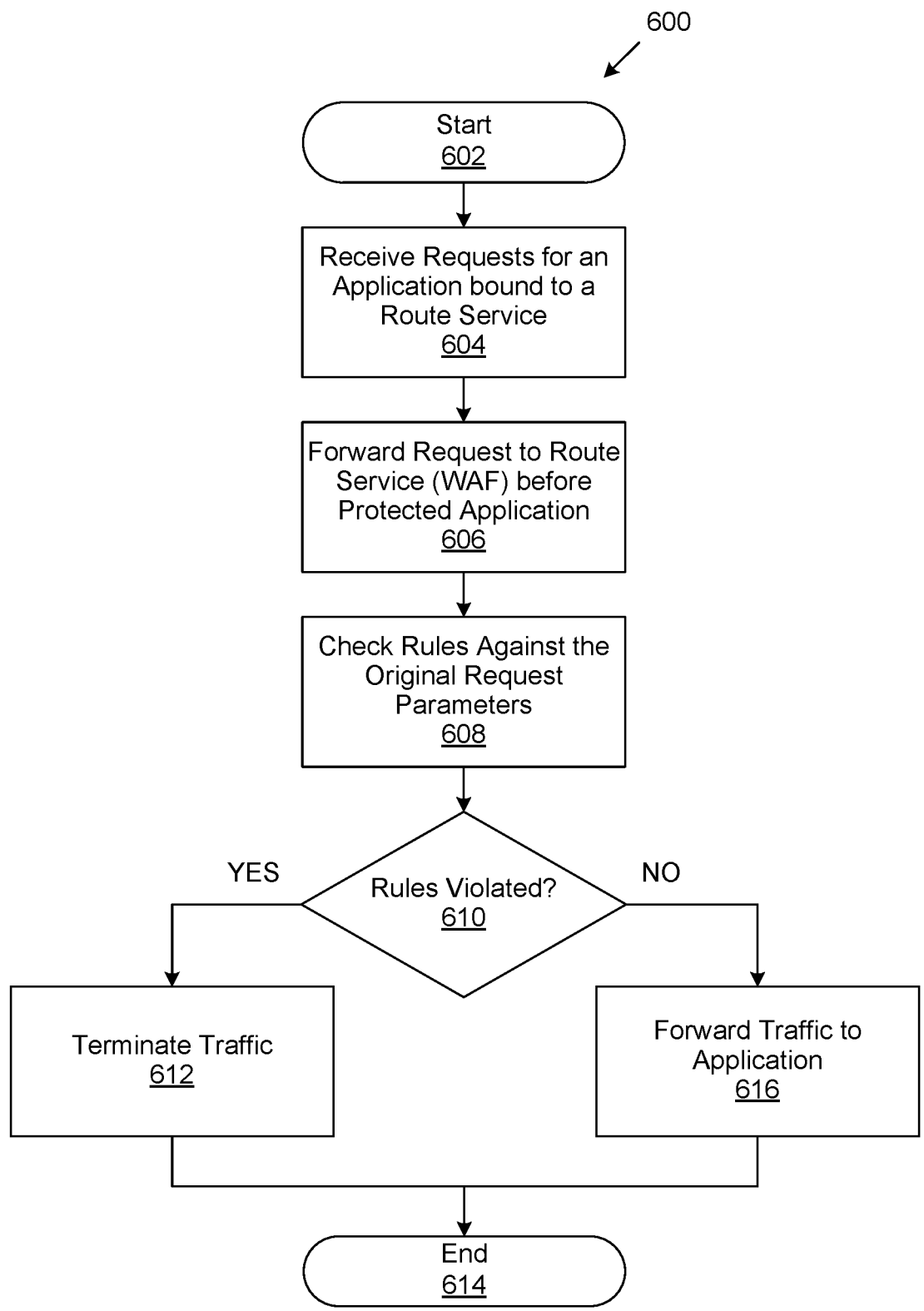
FIG. 6 is a general flowchart for management of a web application firewall (WAF) as a route service.

FIG. 6 is a generalized flowchart 600 for management of a web application firewall (WAF) as a route service. In particular, as a route service, the WAF determines where requests for access to an application are sent or if the requests can be sent to an application. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At step 604, requests for or access to a protected application are received. In certain implementations, the requests are received by the go router 212. The requests can come as HTTP/HTTPS traffic. The protected application are bound to a route service, where the route service can be a WAF. At step 606, the requests or HTTP/HTTPS traffic is forwarded to a WAF cluster (WAF) before the requests or HTTP/HTTPS traffic is sent to the protected application. In certain implementations, original request parameters are saved as headers. At step 608, acting as route service, the WAF cluster (WAF) checks rules at the WAF against the original request parameters which may have been saved as headers. If the rules are violated, following the "YES" branch of block 610, at step 612, the HTTP/HTTPS traffic is stopped, or the requests terminated. At step 614, the process 600 ends. If the rules are not violated, or in other words if the rules are met, following the "NO" branch block 610, at step 616, the requests or HTTP/HTTPS traffic are forwarded to the protected application. In certain implementations, the requests or HTTP/HTTPS traffic are sent forwarded to the go router 212, which then sends the requests or HTTP/HTTPS traffic to the protected application.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for management of a distributed web application firewall (WAF) cluster comprising:
   configuring an infrastructure that includes administrative settings of the WAF cluster that includes one or more WAFs, for one or more protected applications, wherein the configuring includes a ruleset for the WAF cluster directed to access of requestors to the protected applications and the administrative settings includes IP addresses to be blocked based on log entries written to logging repositories by the WAF cluster, wherein the WAF cluster is configured and updated as to a tailored suite for a particular user;
   validating the configured infrastructure of the WAF cluster;
   implementing the validated WAF cluster as a route service for the one or more applications;
   validating requests by the WAF cluster to the protected applications based on the ruleset and IP addresses to be blocked; and
   providing alerts when the protected applications are attached to a message, wherein a message queue/backend is provided data to understand the alerts.

2. The method of claim 1, wherein the configuring is performed by provisioning, binding, updating, and/or deleting the infrastructure of the WAF cluster.

3. The method of claim 1, wherein the configuring is performed at a software deployment platform.

4. The method of claim 1, wherein the WAF cluster resides in a container orchestration tool.

5. The method of claim 1, wherein the configuring is through a WAF management user interface accessible by a user of the WAF cluster and a security administrator.

6. The method of claim 5, wherein WAF management user interface provides for alerts as to suspicious addresses of requestors to the protected applications.

7. The method of claim 1 further comprising connecting to a logging system that tracks WAF logs.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for improved management of a distributed web application firewall (WAF) cluster executable by the processor and configured for:
      configuring an infrastructure that includes administrative settings of the WAF cluster that includes one or more WAFs, for one or more protected applications, wherein the configuring includes a ruleset for the WAF cluster directed to access of requestors to the protected applications and the administrative settings includes IP addresses to be blocked based on log entries written to logging repositories by the WAF cluster, wherein the WAF cluster is configured and updated as to a tailored suite for a particular user;
      validating the configured infrastructure of the WAF cluster;
      implementing the validated WAF cluster as a route service for the one or more applications;
      validating requests by the WAF cluster to the protected applications based on the ruleset and IP addresses to be blocked; and
      providing alerts when the protected applications are attached to a message, wherein a message queue/backend is provided data to understand the alerts.

9. The system of claim 8, wherein the configuring is performed by provisioning, binding, updating, and/or deleting the infrastructure of the WAF cluster.

10. The system of claim 8, wherein the configuring is performed at a software deployment platform.

11. The system of claim 8, wherein the WAF cluster resides in the container orchestration tool.

12. The system of claim 8, wherein the wherein the configuring is through a WAF management user interface accessible by a user of the WAF cluster and a security administrator.

13. The system of claim 12, wherein WAF management user interface provides for alerts as to suspicious addresses of requestors to the protected applications.

14. The system of claim 8 further comprising connecting to a logging system that tracks WAF logs.

15. A non-transitory, computer-readable storage medium embodying computer program code, the computer program code comprising computer executable instructions configured for:
   configuring an infrastructure that includes administrative settings of the WAF cluster that includes one or more WAFs, for one or more protected applications, wherein the configuring includes a ruleset for the WAF cluster directed to access of requestors to the protected applications and the administrative settings includes IP addresses to be blocked based on log entries written to logging repositories by the WAF cluster, wherein the WAF cluster is configured and updated as to a tailored suite for a particular user;
   validating requests by the WAF cluster to the protected applications based on the ruleset and IP addresses to be blocked; and
   providing alerts when the protected applications are attached to a message, wherein a message queue/backend is provided data to understand the alerts.

16. The non-transitory, computer-readable storage medium of claim 15, wherein the configuring is performed by provisioning, binding, updating, and/or deleting the infrastructure of the WAF cluster.

17. The non-transitory, computer-readable storage medium of claim 15, wherein the configuring is performed at a software deployment platform.

18. The non-transitory, computer-readable storage medium of claim 15, wherein the WAF cluster resides in the container orchestration tool.

19. The non-transitory, computer-readable storage medium of claim 15, wherein the configuring is through a WAF management user interface accessible by a user of the WAF cluster and a security administrator.

20. The non-transitory, computer-readable storage medium of claim 15 further comprising connecting to a logging system that tracks WAF logs.

* * * * *